US008112326B2

(12) United States Patent
Benight

(10) Patent No.: US 8,112,326 B2
(45) Date of Patent: Feb. 7, 2012

(54) INVENTORY MANAGEMENT TRACKING CONTROL SYSTEM

(75) Inventor: Barry P. Benight, San Jose, CA (US)

(73) Assignee: TimeSight Systems, Inc., Mt. Laurel, NJ (US)

( * ) Notice: Subject to any disclaimer, the term of this patent is extended or adjusted under 35 U.S.C. 154(b) by 665 days.

(21) Appl. No.: 11/323,408

(22) Filed: Dec. 31, 2005

(65) Prior Publication Data

US 2006/0173756 A1  Aug. 3, 2006

Related U.S. Application Data

(60) Provisional application No. 60/649,796, filed on Feb. 3, 2005.

(51) Int. Cl.
*G06Q 10/00* (2006.01)
*G06Q 20/00* (2006.01)
*H04N 7/18* (2006.01)

(52) U.S. Cl. ............... 705/28; 705/22; 348/143

(58) Field of Classification Search ................ None
See application file for complete search history.

(56) References Cited

U.S. PATENT DOCUMENTS

| | | | | |
|---|---|---|---|---|
| 5,801,618 A * | 9/1998 | Jenkins | ............... | 340/426.14 |
| 6,509,217 B1 * | 1/2003 | Reddy | ............... | 438/153 |
| 7,057,509 B2 * | 6/2006 | Gualdi et al. | ........... | 340/539.13 |
| 7,123,166 B1 * | 10/2006 | Haynes et al. | ........... | 340/932.2 |
| 7,160,786 B2 * | 1/2007 | Kimura | ........... | 438/403 |
| 7,224,735 B2 * | 5/2007 | Porikli et al. | ........... | 375/240.25 |
| 7,561,037 B1 * | 7/2009 | Monroe | ........... | 340/521 |
| 2002/0149481 A1 * | 10/2002 | Shanks et al. | ........... | 340/572.1 |
| 2003/0067542 A1 * | 4/2003 | Monroe | ........... | 348/148 |
| 2004/0143602 A1 * | 7/2004 | Ruiz et al. | ........... | 707/104.1 |
| 2004/0185676 A1 * | 9/2004 | Hasegawa | ........... | 438/769 |
| 2004/0233036 A1 * | 11/2004 | Sefton | ........... | 340/5.53 |
| 2005/0108115 A1 * | 5/2005 | Green et al. | ........... | 705/28 |
| 2005/0271251 A1 * | 12/2005 | Russell et al. | ........... | 382/103 |
| 2006/0126737 A1 * | 6/2006 | Boice et al. | ........... | 375/240.16 |
| 2006/0155430 A1 * | 7/2006 | Burgess | ........... | 701/1 |
| 2006/0174257 A1 * | 8/2006 | Arneson et al. | ........... | 720/718 |
| 2007/0013776 A1 * | 1/2007 | Venetianer et al. | ........... | 348/143 |
| 2007/0069921 A1 * | 3/2007 | Sefton | ........... | 340/932.2 |

* cited by examiner

*Primary Examiner* — Mussa A Shaawat

(57) ABSTRACT

An inventory management tracking control system includes a first event processor operative to receive a video data signal from at least one video capturing device, the video data signal including an archive attribute signal, relating an item being tracked; reader circuitry operative to generate an event attribute signal in response to information provided by a radio frequency identification tag; and a second event processor operative to adjust the image characteristics of the video data signal in response to the event attribute, the second event processor further operative to adjust the event attribute subsequent to the time the event attribute is received. An inventory management control method includes receiving video image data from at least one video capturing device; receiving an archive attribute corresponding to the received video image data; receiving an event attribute corresponding to an occurrence of an event of interest; and adjusting the characteristics of the video image data in response to an event attribute.

11 Claims, 5 Drawing Sheets

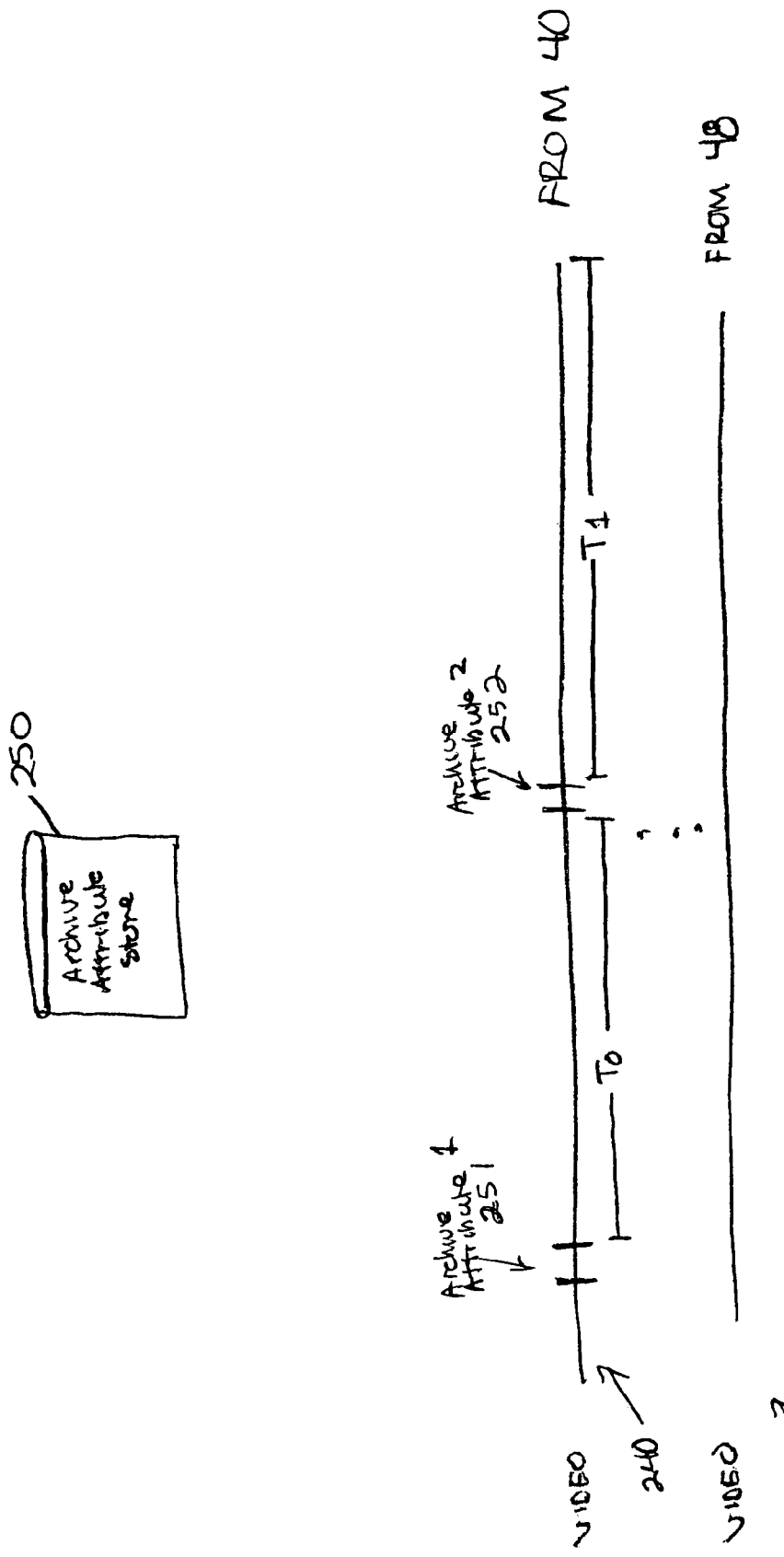

INVENTORY MANAGEMENT TRACKING CONTROL SYSTEM

The present application claims the benefit of U.S. Provisional Application Ser. No. 60/649,796, filed on Feb. 3, 2005.

FIELD OF THE INVENTION

The present invention generally relates to inventory monitoring and tracking systems and, more particularly, to an inventory management control system that automatically correlates video and item movement through a supply chain.

BACKGROUND OF THE INVENTION

Unaccounted for or unidentified inventory reduction events, referred to as shrinkage that occurs in retail, wholesale and commercial establishments is a growing concern. It has been estimated that more than seventy percent of all inventory shrinkage is the direct result of employees either alone, or acting in concert with one or more persons taking inventory from their places of work. A typical inventory reduction (e.g. shrinkage) event involves an employee and an accomplice posing as a patron. For example, the accomplice approaches a cashier with a shopping cart containing merchandise. The cashier takes an item, for example, a high value item such as a camcorder or other electronic device from the shopping cart and pretends to pass it over the item checking scanner coupled to the cash register. In fact, the cashier does not pass the item over the scanner, and returns the item to the cart without registering the transaction. The accomplice leaves the store with the non-scanned item; thereby, resulting in an unaccounted for reduction in inventory.

Another common shrinkage situation occurs in automobile dealerships where multiple personnel may have access to car and truck keys. In these situations, salespersons and other dealership personnel, for example, mechanics that have access to car and truck keys, for example, under the pretext of engaging in a test drive, take a car or truck off the lot and do not return it. The car or truck leaving the lot does not seem unusual as salespersons perform such act several times during the day in the attempt to make a sale or mechanics taking cars from the showroom or lot to a maintenance area. Over time, such events are not noticed given the size of a typical auto dealer sales force.

A conventional way to track and monitor inventory is to use surveillance cameras to monitor the warehouse or other commercial establishment. The surveillance cameras are typically placed at or near the entry points of establishments. The video taken by the surveillance cameras is often stored in a high resolution format. A drawback with such an approach is that the higher the video resolution, the greater the amount of memory required to maintain the images. Memory can be the most expensive portion of a surveillance system. Thus, many owners are reluctant to use high resolution video to monitor their establishments.

Another conventional way to track and monitor inventory is to have a person actively watch the video feed in real time. In addition to human error, the amount of video that has to be watched to prevent an inventory reduction event in real time, or in review time after the event has occurred to determine when the event occurred and what merchandise was taken can be prohibitive. In this situation, as with the video surveillance scenario, the amount of video to be reviewed requires a tremendous expenditure in memory.

Another conventional way to monitor and track inventory is to use bar codes or other suitable identification mechanisms to track how many items are present within a given location during a period of time. Depending on the number of bits contained in the bar code, the specifics of the item (e.g. what warehouse it is stored in or other pertinent physical information) can be retrieved, for example, through the use of handheld devices. A drawback with this approach is that it only monitors gross inventory (e.g. how many of a particular type of products are present within a given location or several locations); it does not provide any information about a particular item. For example, the bar code method provides the ability to determine how many of a particular type of product are present in a given location or series of locations, but the method does not provide the ability to track or provide information about a specific item.

SUMMARY OF THE INVENTION

An inventory management tracking control system includes a first event processor, for example, a server or other suitable processing circuitry, operative to receive a video data signal from at least one video capturing device, the video data signal including an archive attribute signal, relating an item being tracked. The system further includes reader circuitry operative to generate an event attribute signal in response to information provided by a radio frequency identification tag. The system also includes a second event processor, for example, a server, a graphics processor, work-station or other suitable processing circuitry operative to adjust the image characteristics of the video data signal in response to the event attribute. The second event processor is further operative to adjust the event attribute subsequent to the time the event attribute is received.

An inventory management tracking control method includes receiving video image data from at least one video capturing device, for example, a high resolution video camera. Next, receive an archive attribute corresponding to the received video image data. Then, receive an event attribute corresponding to an occurrence of an event of interest. Finally, adjusting the characteristics of the video image data in response to an event attribute.

An advantage provided by the present invention is that it substantially reduces or eliminates human error in detecting and determining the cause of inventory reduction events, and also reduces surveillance costs by controlling the amount of memory needed to store video images.

Another advantage provided by the present invention is that it reduces image data degradation over time by providing the ability to control both the resolution of the image being stored and viewed and the amount of time video images are stored. Through the use of an archive attribute, the image data can also be partitioned based on value to the use. The larger the archive attribute value, the higher the video resolution and the longer the video information is maintained.

Yet another advantage provided by the present invention is that the antenna, which tracks the inventory and corresponding items within the inventory, is capable of operating in the UHF band.

BRIEF DESCRIPTION OF THE DRAWINGS

The aforementioned and related advantages and features of the present invention will become better appreciated and understood upon review of the following detailed description of the invention, taken in conjunction with the following drawings, where like numerals represent like elements, in which:

FIG. 6 illustrates the integration of video and inventory information according to the present invention, for potential later retrieval and use outside of an independent of the inventory management system.

DETAILED DESCRIPTION OF THE INVENTION

An exemplary embodiment of the present invention will now be described with reference to FIGS. 1-6. Although described in connection with a specification application, one of ordinary skill in the art will appreciate and understand that many variations in application are possible and such varying applications are contemplated by the present invention and fall within the scope of the present disclosure.

Figure 1:
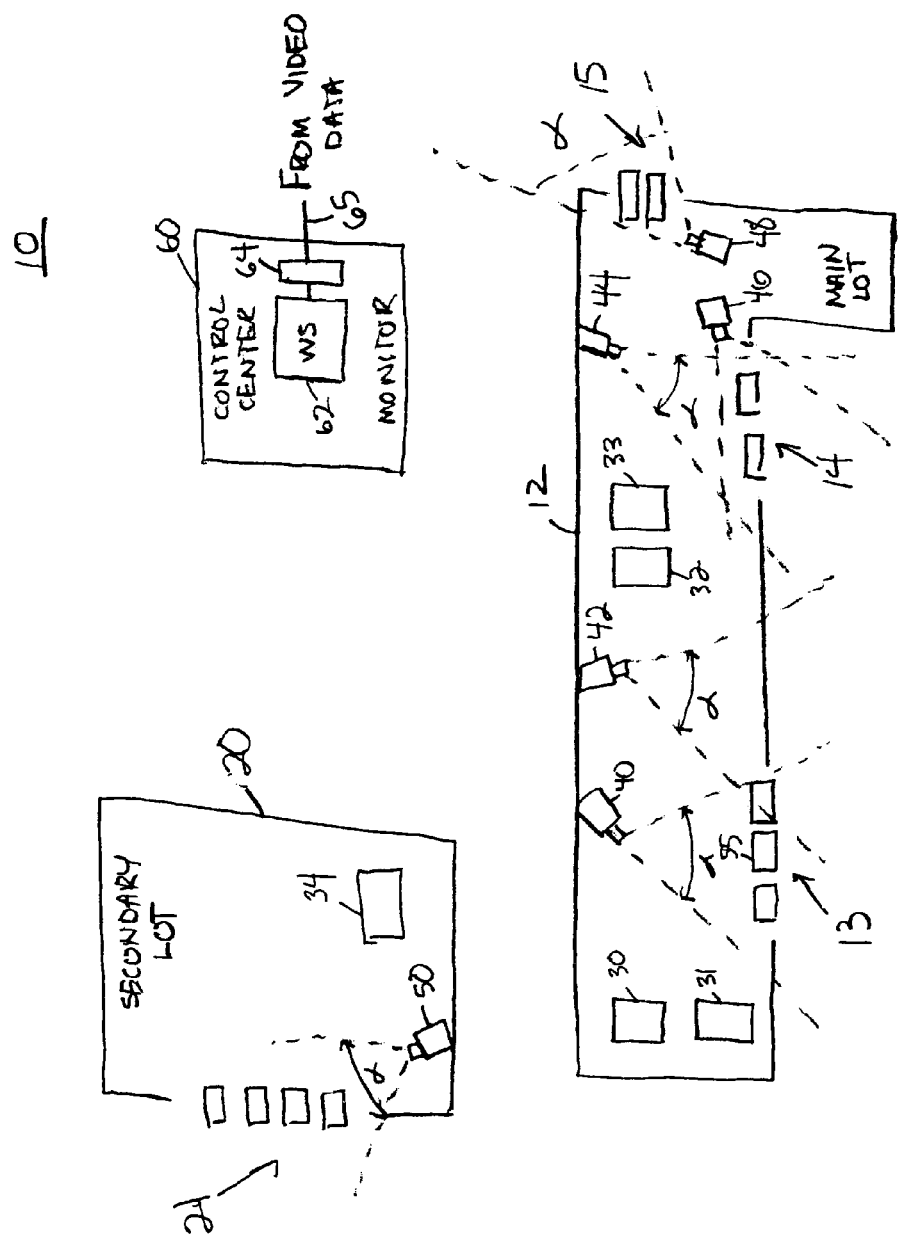
FIG. 1 is an illustration of an automobile dealership incorporating the inventory management tracking control system of the present invention.

FIG. 1 is an illustration of an automobile dealership 10, including the inventory management control system according to the present invention. The automobile lot 10 includes a first or main lot 12 and a secondary lot 20. Each of the lots contains several automobiles 30-34 for potential sale to customers. As is known, before many sales, customers wishing to purchase a particular automobile take the same for a test drive, either with an employee of the automobile dealership of by themselves. In order to take the test drive, the automobile must leave one of the two lots 10-12. Often, a particular car is not on the main lot 10, thus it has to be retrieved from the secondary lot 12 that only the employee has access to. Inventory shrinkage often occurs when an employee takes an automobile 34 from the secondary lot 20 and does not return it. As there are often several cameras 40-48 that provide surveillance of the main lot 12, typically there are not as many cameras 50 focused on the secondary lot 20.

A control or central monitoring station 60, which in a preferred embodiment may be the business center of the automobile dealership 10, may be located between the main lot 12 and the secondary lot 20. A workstation 62, for example, a personal computer, a monitoring system or a graphics processing device is present within the central monitoring station 60. The workstation 62 is coupled to the video feeds of the several cameras 40-48 via a retrieval point 64, for example, a video connection. Often times, though, the central monitoring station 60 is part of the main lot 12 and does not have a clear view of the secondary lot 20 which may be several blocks away.

Each of the lots has several ingress/egress points 13-24. Each of these points is monitored by a high resolution camera 40-50, each having a viewing angle α, and configured of providing a video signal having a normal resolution of between 160×120-640×480 and an enhanced resolution of between 640×480-2560×-1920. Also, embedded either flush with or partially extending from the ground is at least one antenna 55 having the ability to retrieve and transmit information in the UHF band, and more particularly, over the 915 MHz ISM band from the automobiles 30-34 according to the present invention. The structure and operation of the antenna 55 will be described in greater detail with respect to FIGS. 3-4.

Figure 2:
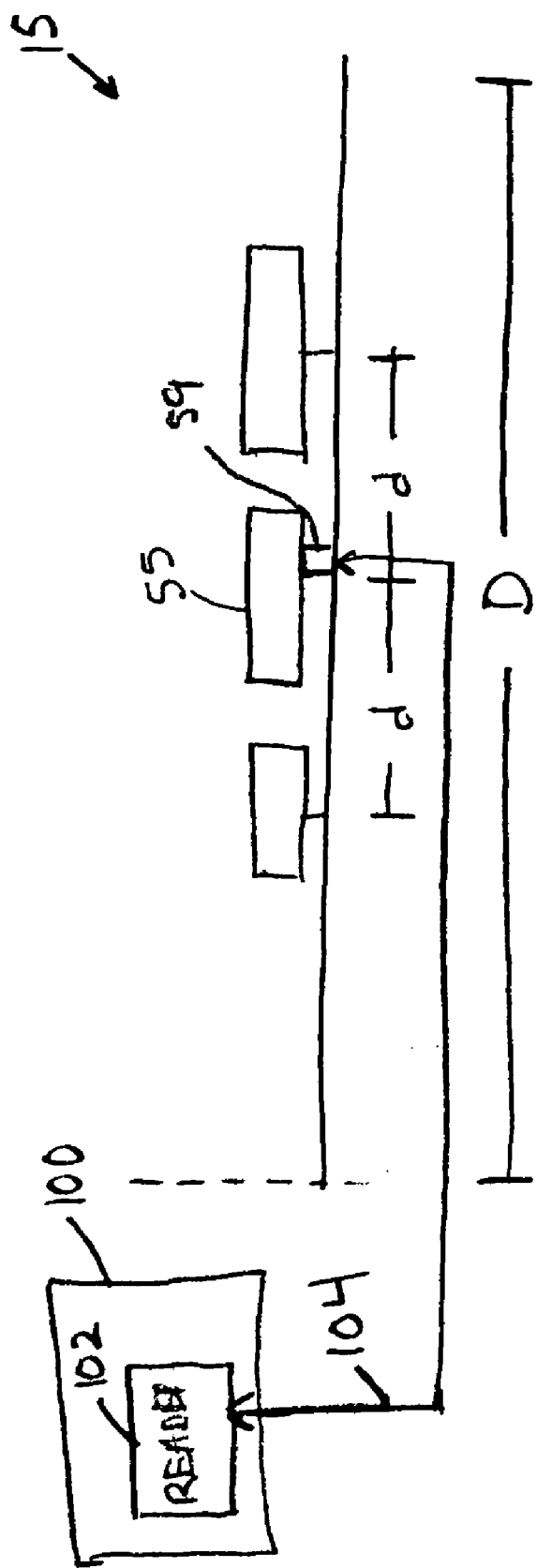
FIG. 2 is an exploded illustration of the components of the inventory management tracking control system according to an exemplary embodiment of the present invention.

FIG. 2 is an exploded illustration of the components of the inventory management tracking control system according to an exemplary embodiment of the present invention. As shown, the antennas 55 are partially extending from the surface of the ingress/point 15, having a width D, of the automobile dealership. The antennas 55 are placed on the driveway of the dealership a width d from each other in order to provide coverage of the entire width D of the driveway such that an attached RFID tag of a corresponding automobile 30-44 will have to pass over the antenna 55 every time the automobile enters and/or leaves the dealership. The antennas 55 include a radio frequency connector 59 which provides the mechanism to embed the antenna 55 into the ground as well act as a transceiver to provide for the sending and receiving of data signals 104 over the UHF band to a reader 102 contained within a monitoring module 100. In application, the monitoring module 100 is implemented using a digital signal processor. However, as will be appreciated and known to those of ordinary skill in the art, the monitoring module 100 may be implemented by any suitable device capable of processing the incoming data signals. The reader 102 may be hard wired to the antenna 55 (as shown) or may be remote from the antenna 55 and send/receive the data signals 104 through a wireless connection or medium.

Figure 3:
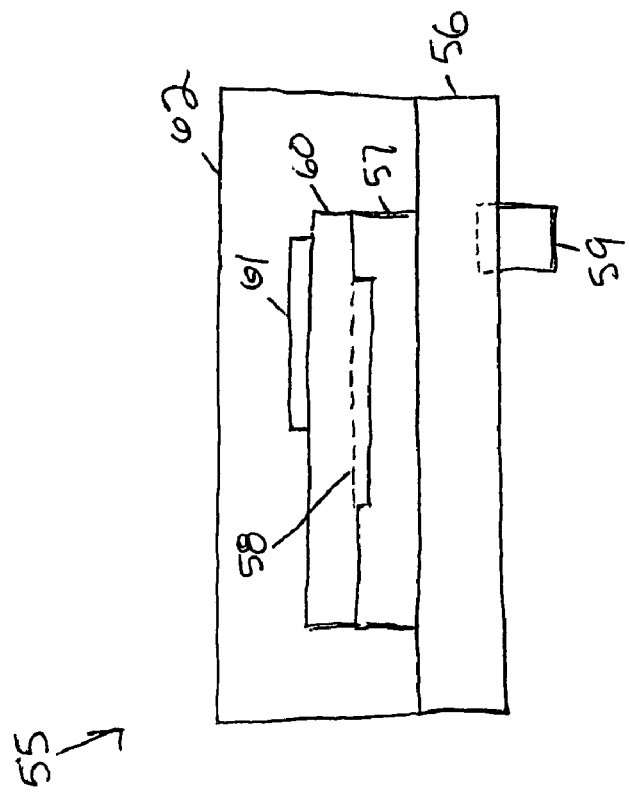
FIG. 3 is a cross sectional side view of an antenna used in the inventory management tracking control system according to an exemplary embodiment of the present invention.

FIG. 3 is a cross sectional side view of an antenna 55 used in the inventory management control system according to an exemplary embodiment of the present invention. The antenna 55 has a six-layer structure formed of materials that ensure that the antenna 55 is rugged enough to handle being run over by the weight of moving vehicles as well as operating in inclement weather conditions. The first or base plate layer 56 is formed from a first conductor, for example, aluminum, having a thickness of about ¼ inch. A standard radio frequency module 59 is coupled to the underside of the aluminum (e.g. first) layer 56, which provides the ability to mount the antenna 55 to the driveway surface of the automobile lot 10. The second or separator layer 57 is formed from an insulator, for example, HDPE or PTFE having a thickness of about ½ inch. The third layer 58 is formed from a second conductor, for example, copper, having a thickness of about 1/100 inch. The third layer 58 is configured to fit within a pocket or other suitable sized opening 57a formed in the second layer 57. The third layer 58 provided a connection to the radio frequency module 59 and the remainder of the antenna structure. A fourth or upper block layer 60 is formed from an insulator material, for example, Teflon or plastic, having a thickness of about ½ inch is coupled to the second or insulator layer 57, thereby forming a protective layer around the third or feedline layer 58. A fifth or patch layer 61 is formed from a conductor material, for example, copper, having a thickness of about 1/100 inch. The patch layer 61 is electrically coupled to the RF connector 59, through the third or feedline layer 58. A sixth or cover layer 62 is made from an insulator material, for example, plastic having a thickness of about ¼ inch is coupled to the first or base plate layer 56; thereby, acting as a protective cover for the antenna and the several components contained therein. Although illustrated as being independent segments, the antenna 55 may be formed from a molded process. The antenna 55 operates in the UHF band, and in particular over the 915 MHz ISM band for radio frequency transmissions.

Figure 4:
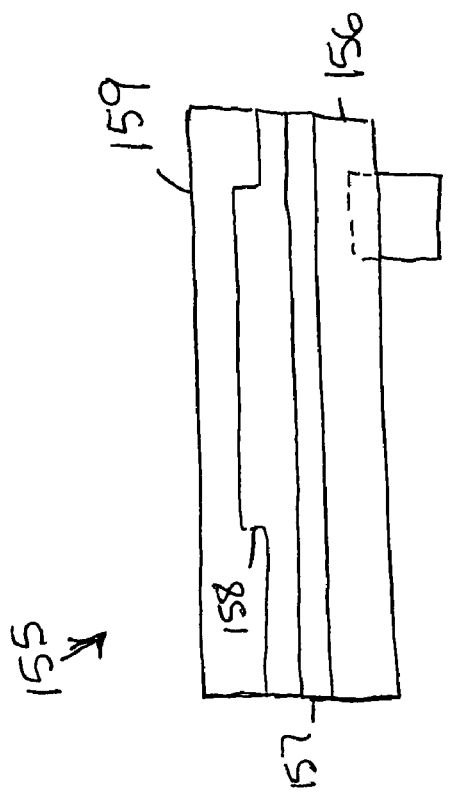
FIG. 4 is a cross sectional side view of an antenna used in the inventory management tracking control system according to an alternate embodiment of the present invention.

FIG. 4 is a cross-sectional side view of an antenna 155 used in the inventory management tracking control system according to an alternate embodiment of the present invention. In this embodiment, the antenna 155 is formed from a molded series of materials; thereby, resulting in the third layer 158 substantially covering both the first conductor layer 156 and the conductor second layer 157. In this manner, the materials that form the first conductor layer 156 and the second conductor layer 157 do not experience significant contact with outside weather conditions. The antenna 155 has a four layer structure formed of materials that ensure that the antenna 155 is rugged enough to handle being run over by the weight of moving vehicles as well as operating in inclement weather. As with antenna 55, the alternate antenna embodiment operated in the UHF band, and in particular the 915 MHz ISM band suitable for radio frequency transmissions.

The first layer 156 is formed from a conductor, for example, aluminum, having a thickness of about 1/12 inch. The second layer 157 if formed from a second conductor, for example, copper, having a thickness of about 6/7 inch. The third layer 158 is formed of plastic, or other suitable insulator, and has a thickness of about 1/16 inch. As shown, the insulator layer 158 substantially covers the first conductor layer 157; thereby, shielding the conductor (e.g. copper) from inclement weather conditions that may occur in the myriad weather climates that the antenna 155 will be subject to. A cover layer 160, made from an insulating material, for example, plastic or PTFE (Teflon), encapsulates the antenna structure 155; thereby, preventing the components that comprise the antenna 155 from contacting the elements, and also provide an outer surface that can withstand the pressures of automobile weight A standard radio frequency module 159 is coupled to the underside of the aluminum layer 157, which provides the ability to mount the antenna 155 to the driveway surface of the automobile lot 10

Figure 5:
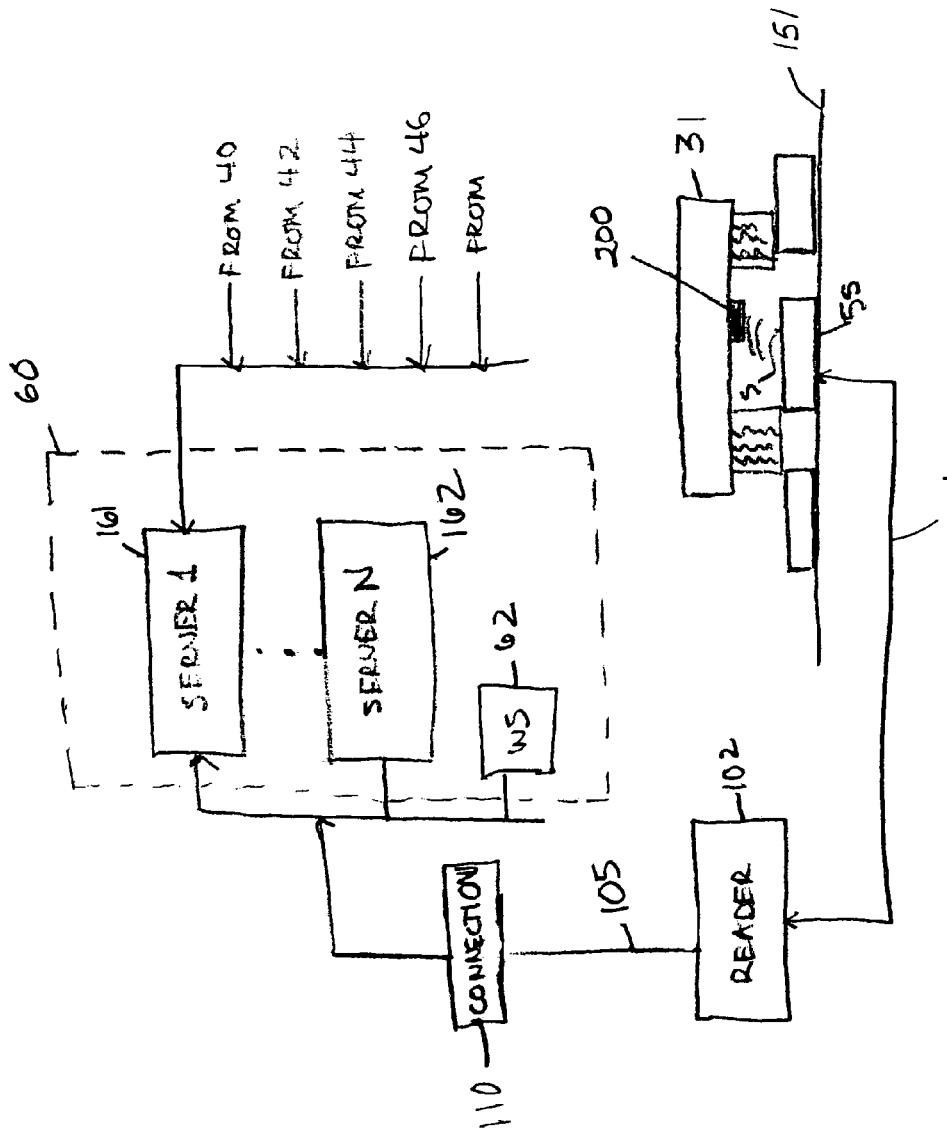
FIG. 5 is a schematic block diagram of the inventory management tracking control system according to the present invention and its interconnection to a monitoring station.

The operational aspects of the present invention will now be described with reference to FIGS. 5 and 6. FIG. 5 is a schematic block diagram of the inventory management tracking control system of the present invention and its interconnection to a central monitoring station 60. FIG. 6 illustrates the integration of video and archive attribute information according to the present invention, for subsequent retrieval and processing outside of the inventory management tracking control system. As shown, the several antennas 55 are located substantially flush to the driveway surface 151. In application, the reader 102 transmits a data request signal over transmission medium 104, which then causes the RF module 59 to generate a signal S, that when received by a radio frequency identification (RFID) tag 200, energizes the RFID tag 200; thereby, causing the information contained within the RFID tag 200 to be transmitted to the reader. The information transfer is principally conducted in the UHF band, and in particular, the 915 MHz ISM band.

The RFID tag 200 includes approximately 96 bits of information that are used to uniquely identify the particular object or item that the corresponding RFID tag is coupled to. Thus, through the use of the RFID tag 200, each item (e.g. individual car or truck) within a class of items (e.g. automobile) can be individually tracked or otherwise monitored throughout the inventory process. Stated differently, a particular item of interest can be independently tracked. Thus, in application, when an automobile either enters or leaves either the main lot or the secondary lot, the RFID tag 200 will act as a marker to establish which exact automobile left (or entered) one of the lots and when.

The RFID tag 200 bit information is transmitted over transmission medium 104 to the reader 102. The reader 102 then processes the tag information 104 and transmits the same to a first event processor 161, for example, software executing on server 1 and/or a second event processor 162, for example, software executing on server 2 over a suitable connection 110, thereby, indicating the presence of the RFID tag 200. Alternatively, the first and second event processors 161, 162 may be implemented as stand alone devices, for example, one or more processors, dedicated hardware, and other suitable processing and storage devices and combinations thereof. The RFID tag 200 information may also be transmitted to the workstation 62, located in the central monitoring station 60. The suitable connection 110 may be a local area network, a wide area network, a hard-wired connection or wireless connection.

The first event processor 161 and the second event processor 162 are maintained within the monitoring station 60 which is typically located in the business office of the automobile dealership. Also provided to the first event processor 161 is video data 240, 248 from the several high-resolution cameras 40-48 that survey the dealerships lots. In an alternate embodiment, the video data 240, 248 from the high-resolution cameras 40-48 may be stored in the second event processor 162 or other suitable local or remote memory device. The video data 240, 248 is stored along with the corresponding archive attribute 250 to provide an integrated tracking methodology. The video data 240, 248 can be considered a sequence of frames starting at the present time and running back into the past. Each instant of time has one or more associated archive attributes associated therewith. Each such attribute is a distillation of the relative value of the video from that instant of time, as well as an indication of how much information within the video data should be retained and at what resolution. There is always at least one archive attribute 250 associated with each instant of each video stream. There are two general types of archive attributes: an event related attribute and a default attribute.

An event related attribute, or event attribute is an archive attribute generated in response to some incident or situation for which the business value of the video is different than a default value, for example, when a automobile that exceeds a given retail price leaves the lot, or automobile leaves the lot for a longer than expected period of time. Events can be those relevant events external to the video, for example, an automobile leaving the lot (e.g. passing over one of the several antennas 55 located throughout the ingress/egress points), or may be internal to the video processing, for example, motion in the video frame. An event related attribute may be modified by the user, for example, at the end of the day or by changing the inventory or identification of a particular automobile or by future processing. For example, when an automobile is driven or otherwise taken off the lot, an archive attribute 251 may be set to retain maximum video data 240 information (e.g. video resolution is set to 640×480-2560×1920) for a period of time ($T_0$), for example, fifteen minutes before the event. If the automobile returns, which is triggered by the reader 102 retrieving corresponding information from the associated RFID tag 200 passing over antenna 55, the archive attribute, for example, archive attribute 252 could be modified to keep less than the maximum, but more than the default, amount of information.

There is an ordering to all archive attributes, such that any archive attribute is either lower or higher than some other archive attribute. Generally, this order is determined such that the lower archive attribute causes the first and second event processors to retain less information (e.g. the video data is stored at a lower or normal resolution, for example, 160×120-640×480) while higher archive attributes result in the first and second event processors to retain more information (e.g. the video data is stored at a higher resolution, for example, 640×

480-2560×1920) for a longer than normal period of time before and/or after the event that triggered the corresponding archive (e.g. event) attribute. Alternately, video data information may be stored at resolutions within a given range, for example, the lower resolution information may be stored at values within the 160×120-640-480 range and the higher resolution information may be stored at values within the 640×480-2560×1920 range. Where more than one archive attribute is associated with a moment of video, for example, when more than one automobile is leaving the lot at the same time or two video cameras are capturing or have captured the same event from different locations, the same location, for example, one or more camera monitoring a single ATM or POS system, and/or angles, the higher attribute will determine the actions to be taken. The default archive attribute is the lowest attribute, and thus, has the lowest priority.

A processing point is a point in time where the archive attributes associated with an instant of video affect the amount of information to be retained. There may be multiple processing points associated with a video stream. Generally, the processing points are specified by one or more business rules, in terms of the age of the video being processed. The highest or greatest archive attribute for each moment of video determines the transformation that occurs in the video data at the processing points. In an exemplary embodiment, the processing points may correspond to the locations of the several archive attributes 251, 251 along video stream 240. Table 3 provides a matrix of video data processing action that may be performed on the video data based on the archive attributes (0, 1, 2) of Table 1, for example, archive attributes 251, 252 associated with video stream 240 and the processing points (A, B, C, D) of Table 2, for example, the locations corresponding to archive attributes 251, and 252.

TABLE 1

| Archive Attribute | Type |
|---|---|
| 0 | Default |
| 1 | Normal Business Interest (e.g. resulting from a normal test drive) |
| 2 | Heightened Business Interest (e.g. automobile gone for more than a given period of time (60 minutes) |

TABLE 2

| Processing Point | Time Period |
|---|---|
| A | Video is six hours old |
| B | Video is two days old |
| C | Video is fourteen days old |
| D | Video is ninety days old |

TABLE 3

| | 0 | 1 | 2 |
|---|---|---|---|
| A | Keep all video frames at reduced resolution | Keep all video frames at full resolution | Keep all video frames at full resolution |
| B | Keep no video frames | Keep 1 FPS at reduced resolution | Keep all video frames at full resolution |
| C | N/A | Keep no video frames | Keep 1 FPS at full resolution |
| D | N/A | N/A | Keep no video frames |

At the processing point, there are a number of transformations that can be made to reduce the volume of data retained, while at the same time, keeping important information. Such transformations may include, but are not limited to: dropping frames (reducing total frame rate); reducing total resolution (number of pixels); increasing the compression (reducing the number of high spatial frequency components); and dropping image color components (converting to monochrome). The aforementioned transformations may be applied either individually or in combination on the video data by users subsequent to the image data capture to achieve the desired results.

In an exemplary embodiment, the RFID tags are used to index the video images being stored, for example, in the first event processor. For example, when antenna 55 receives a signal from the RFID tag 200, indicating the presence of RFID tag 200, the corresponding video image data from video camera 40 (FIG. 1) responsible for that particular area of the lot is stored in the first event processor 161 at a location indexed by the RFID tag 200. As such, both the video information of the automobile including the RFID tag 200 and the information about that particular automobile are maintained in the first event processor 161 for later processing and/or viewing, for example, at the workstation 62.

In addition to the subsequent retrieval and viewing of the video information, the present invention allows for one or more warnings or indicators of particular activity to be provided. For example, when the RFID tag 200 associated with an automobile of sufficient business interest traverses one or more of the antennas 55, an audio warning, for example, an alarm may be activated thereby indicating that an automobile that is not authorized to be moved is leaving the lot. Alternatively, a visual warning, for example, a screen being illuminated or lights being activated may also indicate that an automobile that is not authorized to be moved is leaving the lot. Additionally, a combination of audio and visual warnings may be activated based, for example, on the business rules being used by the particular establishment.

The information maintained within the event processor, in its raw or processed form may also be printed out on a corresponding device, for example, a printer, plotter or other suitable device (not shown). The information may also be exported as an mpeg, jpeg or other suitable format file. Further, the collected and/or processed information may be accessed and viewed by suitable hand held devices by personnel remote from the location from which the information was gathered. Also, the data gathering and processing technique of the present invention may be used in other contexts. For example, keys maintained on a key board may have RFID tags associated therewith, such that the individual keys can be tracked just as any other item of interest. In the automobile dealership situation described above, in addition to monitoring the presence or location of a particular automobile, the user will also have the ability to continually monitor the location of the particular key(s) associated with a particular automobile. Thus, if the keys for a given automobile are not present at or near the board for a specified period of time, an event record may be generated or an alarm may be initiated to alert the user of the missing key(s).

The above detailed description of the invention has been provided for the purposes of illustration and description and to describe the novel features, concepts and application of the foregoing. The present invention should not be limited to the discussion provided above, but should form a basis of understanding as various modifications and implementations may be applied hereto. Any such modifications and implementations are contemplated by and fall within the spirit and scope of the present invention, as further defined in following claims.

What is claimed is:

1. An inventory management tracking control system, comprising:
   a first event processor operative to receive video data from at least one video capturing device, the captured video data having a first image characteristic and further comprising a sequence of frames corresponding to a given time period and including an archive attribute, comprising one of a default attribute and one or more event attributes, relating to an event associated with an item being tracked, the archive attribute corresponding to a relative value of the sequence of frames and an indication of the number of frames to be retained at a given resolution;
   reader circuitry operative to generate the one or more event attributes in response to information provided by a triggering device; and
   a second event processor, coupled to the reader circuitry, operative to adjust image characteristics and the storage time period of the captured video data in response to business rules corresponding to the one or more event attributes, the second event processor further operative to cause the captured video data to be stored for a predetermined period of time at the first image characteristic and cause the adjusted image characteristics of the captured video data to be stored for a subsequent period of time, the second event processor further operative to adjust the event attribute subsequent to the time the event attribute is received.

2. The control system of claim 1, further including memory circuitry operative to maintain the archive attribute and the one or more event attributes, and further operative to maintain the adjusted image characteristics of the captured video data in response to the one or more event attributes.

3. The control system of claim 2, wherein the second event processor is further operative to cause the memory circuitry to purge previously stored video data after a predetermined period of time has elapsed.

4. The control system of claim 2, wherein the one or more event attributes are generated according to business rules.

5. The control system of claim 1, further including display means operative to display the image characteristics of the captured video data and the adjusted image characteristics of the captured video data in response to the receipt of an event attribute.

6. The control system of claim 1, wherein the first image characteristic includes image data having a resolution value in the range of 160×120-640×480.

7. The control system of claim 1, wherein the adjusted image characteristic includes image data having a resolution value in the range of 640×480-2560×1920.

8. The control system of claim 1, wherein the image characteristics of the captured video data include the resolution of the captured video image being stored or the number of frames of the captured video data being maintained.

9. The control system of claim 1, wherein the at least one video capturing device includes a high resolution video camera positioned relative to a geographic area to be monitored, the high resolution camera having a viewing angle $\alpha$.

10. The control system of claim 1, wherein the second event processor is further operative to cause the memory circuitry to store the captured video data at a first resolution in the range of 160×120-640×480 and further to cause the memory circuitry to store the adjusted image characteristics at a second resolution in the range of 640×480-2560×1920.

11. The control system of claim 4, wherein the one or more event attributes are generated by a user modifying the archive attribute during a time post storage of the captured video image data.

* * * * *